(12) United States Patent
Fujimoto et al.

(10) Patent No.: US 7,793,764 B2
(45) Date of Patent: Sep. 14, 2010

(54) WET BRAKE SYSTEM FOR A VEHICLE AND A UTILITY VEHICLE COMPRISING THE WET BRAKE SYSTEM

(75) Inventors: Hiroyuki Fujimoto, Fukuroi (JP); Haruo Kitai, Akashi (JP); Izumi Takagi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 679 days.

(21) Appl. No.: 11/502,802

(22) Filed: May 30, 2007

(65) Prior Publication Data
US 2007/0290551 A1    Dec. 20, 2007

(30) Foreign Application Priority Data
May 31, 2006    (JP)    ................ 2006-151914

(51) Int. Cl.
*F16D 55/04*    (2006.01)
(52) U.S. Cl. .................... 188/71.4; 188/71.6; 188/72.7; 188/72.9; 188/264 E
(58) Field of Classification Search ................ 188/71.4, 188/71.6, 72.6, 72.7, 72.9, 264 B, 264 E, 188/264 R, 72.8; 74/53, 54, 55
See application file for complete search history.

(56) References Cited

U.S. PATENT DOCUMENTS

| | | | | | |
|---|---|---|---|---|---|
| 3,734,242 | A | * | 5/1973 | Klaue ........................ | 188/72.7 |
| 4,179,016 | A | * | 12/1979 | Alderman et al. .......... | 188/71.4 |
| 4,213,519 | A | * | 7/1980 | Moser et al. ............... | 188/71.4 |
| 4,383,593 | A | * | 5/1983 | Micke ........................ | 188/72.7 |
| 4,795,003 | A | * | 1/1989 | Colgate ..................... | 188/71.4 |

FOREIGN PATENT DOCUMENTS

| | | |
|---|---|---|
| JP | 2004-050952 | 2/2004 |
| JP | 2005-207602 | 8/2005 |

\* cited by examiner

*Primary Examiner*—Thomas J Williams
(74) *Attorney, Agent, or Firm*—Alleman Hall McCoy Russell & Tuttle LLP

(57) ABSTRACT

A wet brake system for a vehicle including a case; an internal operation lever disposed inside the case; a hydraulic cylinder which is integrally mounted to the case and is configured to actuate the internal operation lever; and a brake mechanism configured to be operated by the actuation of the internal operation lever by the hydraulic cylinder to apply a braking force to an axle of the vehicle.

11 Claims, 9 Drawing Sheets

WET BRAKE SYSTEM FOR A VEHICLE AND A UTILITY VEHICLE COMPRISING THE WET BRAKE SYSTEM

TECHNICAL FILED

The present invention relates to a wet brake system for a vehicle and, more particularly to a wet brake system for a utility vehicle.

BACKGROUND OF THE INVENTION

Utility vehicles for various purposes such as leisure activities or work, for example, hunting trucks or farming trucks, commonly travel off-road. In utility vehicles equipped with dry brake systems, brake components such as a brake pad and a brake shoe tend to wear out due to adhesion of mud, dust, and other substances, decreasing the life of the brake. In contrast, in utility vehicles equipped with wet brake systems, a brake is accommodated in a case, and is less susceptible to mud, dust, and other substances, increasing its life.

However, the brake systems mounted in the utility vehicles are typically configured so that a brake unit for front wheels and a brake unit for rear wheels operate in association with each other by using, for example, a cable or an oil pressure.

The brake system using the cable is advantageously inexpensive, but requires precision adjustment. The brake system using the oil pressure is disclosed in for example, Japanese Laid-Open Patent Application Publications Nos. 2004-050952 and 2005-207602.

The wet brake system includes a brake mechanism configured to apply a braking force to an axle of the vehicle, and uses lubricating oil or the like to cool the brake mechanism.

The wet brake systems disclosed in Japanese Laid-Open Patent Application Publications Nos. 2004-050952 and 2005-207602, each includes an internal operation lever which is operated via an external operation lever attached coaxially outside a case to directly actuate a brake mechanism.

However, in the above described wet brake systems including the internal and external operation levers, one of the operation levers is exposed to the outside of the case, and therefore, an operating part of the operation lever is susceptible to mud and other substances from a road surface or is likely to be damaged by bouncing stones. In addition, it is necessary to adjust a link mechanism between the external operation lever and a hydraulic cylinder for driving the external operation lever as in the cable, and assembly steps therefore increase.

SUMMARY OF THE INVENTION

The present invention addresses the above described conditions, and an object of the present invention is to provide a wet brake system which is capable of protecting an operating portion of an operation lever from mud and other substances from a road surface, bouncing stones, etc., and does not require precise adjustment, and a utility vehicle comprising the wet brake system.

According to one aspect of the present invention, there is provided a wet brake system for a vehicle comprising a case; an internal operation lever disposed inside the case; a hydraulic cylinder which is integrally mounted to the case and is configured to actuate the internal operation lever; and a brake mechanism configured to be operated by the actuation of the internal operation lever by the hydraulic cylinder to apply a braking force to an axle of the vehicle.

In such a construction, an external operation lever is not required, since the internal operation lever is disposed inside the case. Therefore, the operating portion of the internal operation lever can be protected from mud and other substances from a road surface or bouncing stones. In addition, precise adjustment becomes unnecessary.

The brake mechanism may include a ball cam mechanism that is disposed inside the case and is configured to provide engagement and disengagement between a brake friction plate coupled to the axle side and a pressing plate coupled to the case side; and the internal operation lever may be configured to operate the ball cam mechanism to provide engagement and disengagement between the friction plate and the pressing plate. With such a simple construction, a reliable braking action can be achieved by the oil pressure.

The case and other components of the wet brake system may be positioned behind an engine of the vehicle. In such a construction, the engine disposed in front protects the wet brake system from mud and other substances from the road surface, bouncing stones, etc.

The case may include a gear case configured to accommodate a rear wheel final reduction gear unit of the vehicle. Thereby, the case can be formed integrally with the gear case.

The hydraulic cylinder may include an operating portion protruding into the inside of the case; and the operating portion may be coupled to the internal operation lever by a ball joint. In such a construction, an actuating force of the hydraulic cylinder can be transmitted to the internal operation lever smoothly.

The hydraulic cylinder may further include a piston portion provided to be movable in an axial direction thereof by an action of an oil pressure, the piston portion having an axial end surface which is configured to make curved-surface contact with a base end of the operating portion. In this case, the operating portion may be configured to be movable in the axial direction of the piston portion and to be movable so as to be tilted with respect to the axial direction by the action of the oil pressure via the piston portion, for actuating the internal operation lever. In such a construction, the force of the hydraulic cylinder can be transmitted to the internal operation lever smoothly, even when an actuating angle of the hydraulic cylinder changes according to the rotation of the internal operation lever.

A case of the hydraulic cylinder may have an air release opening oriented upward to release air in a cylinder portion accommodating the piston. In such a construction, air release from the case of the hydraulic cylinder can be easily accomplished during assembly, and maintenance therefore becomes easy.

According to another aspect of the present invention, there is provided a utility vehicle comprising: a wet brake system for a vehicle including: a case; an internal operation lever disposed inside the case; a hydraulic cylinder which is integrally mounted to the case and is configured to actuate the internal operation lever; and a brake mechanism configured to be operated by the actuation of the internal operation lever by the hydraulic cylinder to apply a braking force to an axle of the vehicle.

The above and further objects and features of the invention will more fully be apparent from the following detailed description with accompanying drawings.

DETAILED DESCRIPTION OF THE INVENTION

Now, a utility vehicle according to an embodiment of the present invention will be described with reference to the accompanying drawings. In this embodiment described below, directions are referenced from the perspective of a rider (not shown) riding in a utility vehicle of FIG. 1, except as otherwise specified.

Figure 1:
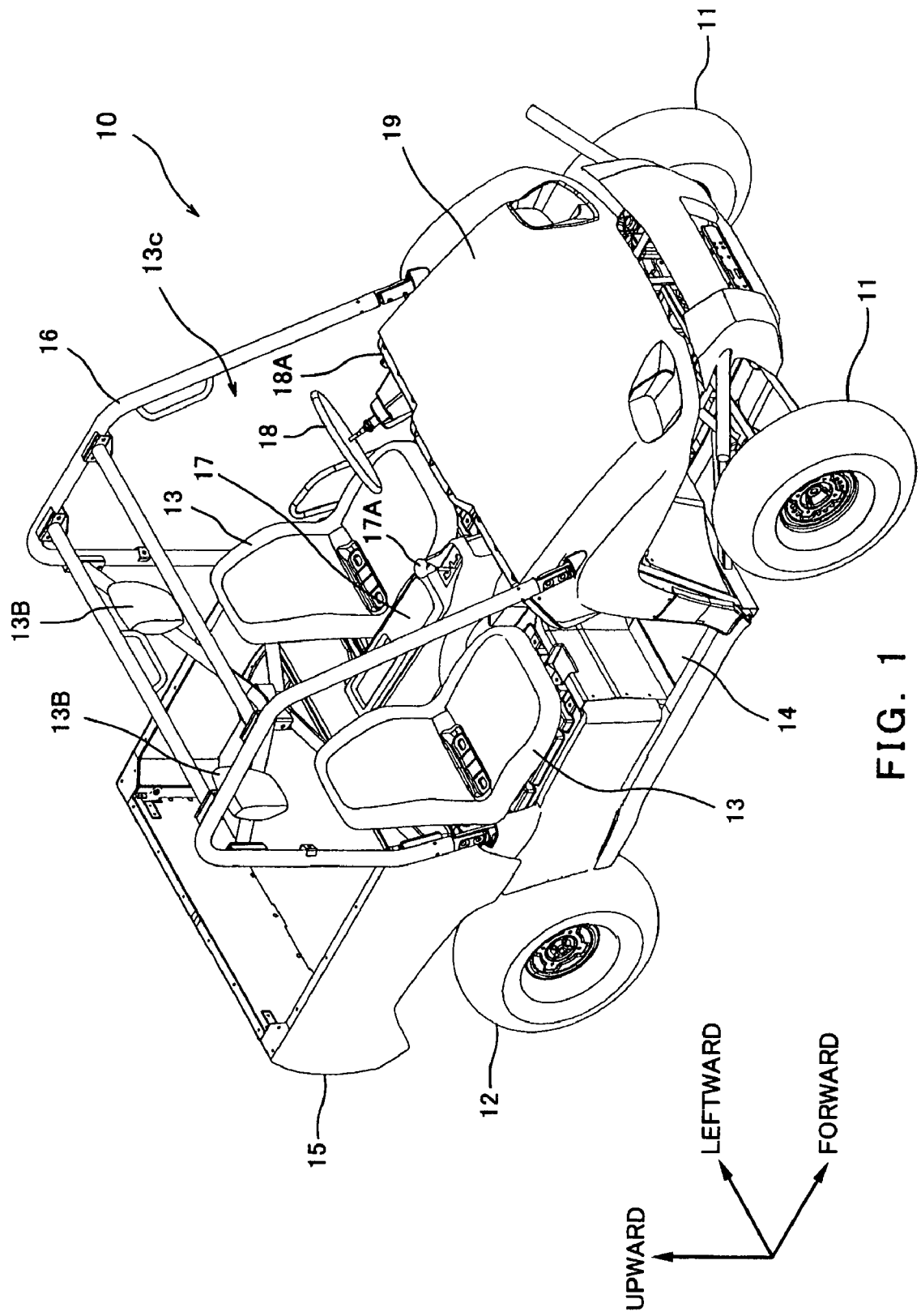
FIG. 1 is a perspective view of a utility vehicle equipped with a wet brake system according to an embodiment of the present invention, as viewed from rightward and forward.

FIG. 1 is a perspective view of the utility vehicle equipped with a wet brake system according to an embodiment of the present invention, as viewed from rightward and forward. As shown in FIG. 1, the utility vehicle 10 may be, for example, a golf cart or a hunting truck for sport activities, a farming truck for working purpose, etc. The utility vehicle 10 may be a vehicle equipped with three wheels or five or more wheels, instead of four wheels as illustrated in this embodiment.

The utility vehicle 10 includes a passenger riding cabin 13c formed between front wheels 11 and rear wheels 12. Two seats 13 are arranged in the cabin 13c in a lateral direction of a vehicle body of the utility vehicle 10. A console box 17 provided with an article container is equipped between the two seats 13. A shift lever 17A protrudes upward from a front portion of the console box 17. A flat floor 14 on which passenger's feet rest is provided in front of the seats 13. An accelerator pedal and a brake pedal (see FIGS. 3 to 5) are provided in front of the seat 13 on a driver's side. An instrument panel 18A attached with a handle 18 is disposed above these pedals.

A hood 19 is disposed in front of the instrument panel 18A to cover the two front wheels 11 from above. A cabin frame member 16 defining the cabin 13c extends from right and left ends of a rear portion of the hood 19, and to a region behind the seats 13. Head rests 13B of the seats 13 are attached to the cabin frame member 16 above back portions of the seat 13.

A load-carrying platform 15 is provided behind the cabin frame member 16 so as to cover the two rear wheels 12 from above.

Figure 2:
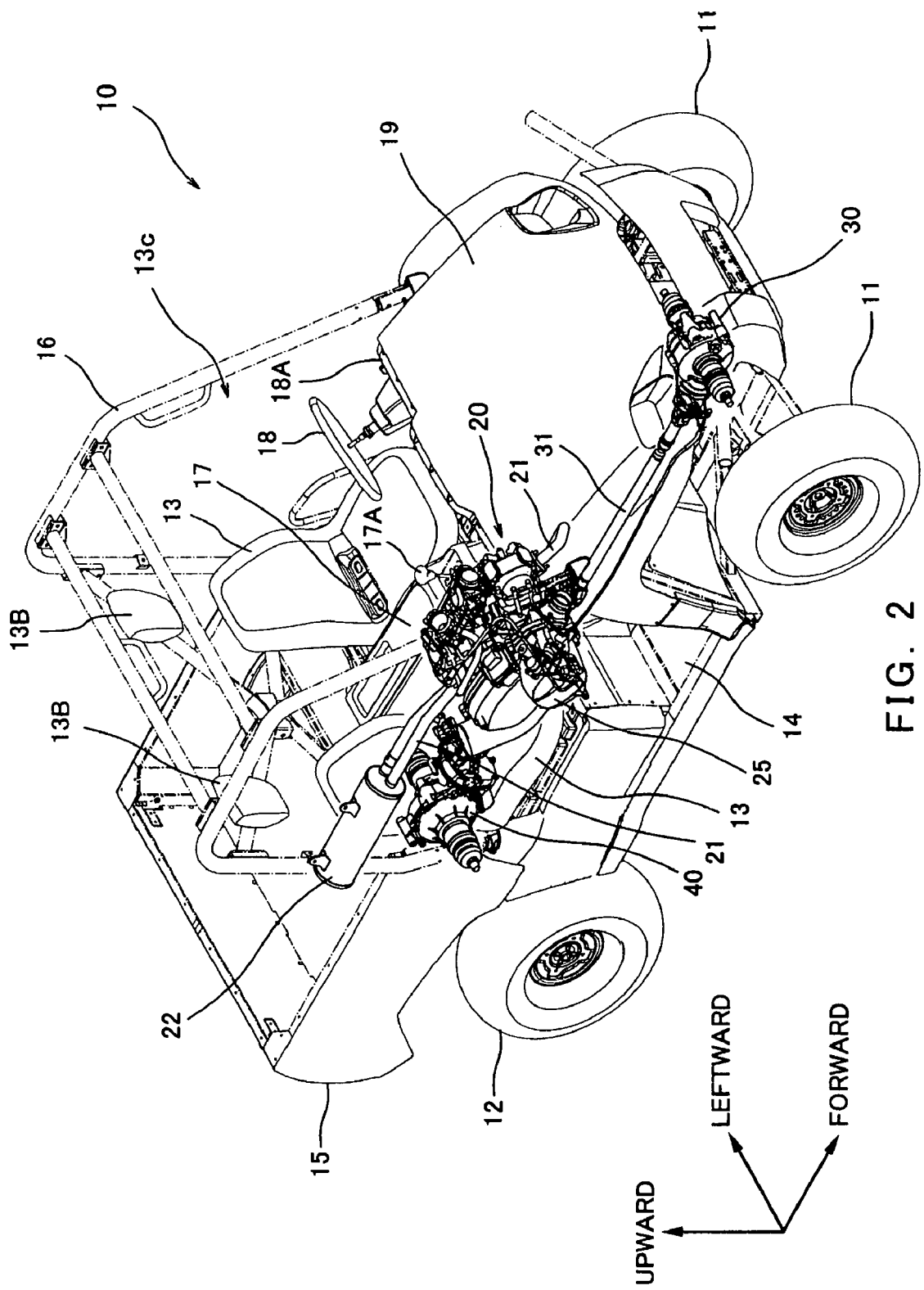
FIG. 2 is a perspective view of a drive system of the utility vehicle of FIG. 1, as viewed from rightward and forward.

FIG. 2 is a perspective view of a drive system of the utility vehicle 10 of FIG. 1. An engine unit 20 of the utility vehicle 10 is center-mounted between the right and left seats 13 (see FIG. 4) and below the seats 13 (see FIG. 3), to be precise, immediately below the console box 17.

In this embodiment, the engine unit 20 is a V-type two-cylinder engine including cylinders arranged in a longitudinal direction of the vehicle body. A first exhaust pipe 21 extends from a front surface of the engine unit 20, through a region under the engine unit 20, and to a region behind the engine unit 20. A second exhaust pipe 21 extends rearward. These two exhaust pipes 21 are coupled to a muffler 22 disposed under the load-carrying platform 15.

The engine unit 20 is integrally equipped with a transmission 25 including a belt-drive gearless transmission. One end of a front propeller shaft 31 is coupled to a front output end of the transmission 25. The front propeller shaft 31 extends forward through a region under the floor 14, and an opposite end thereof is coupled to the front wheels 11 via a front gear assembly (front final reduction unit) 30. One end of a rear propeller shaft 41 (FIG. 4) is coupled to a rear output end of the transmission 25, and an opposite end thereof is coupled to the rear wheels 12 via a rear gear assembly (rear final reduction unit) 40.

Figure 3:
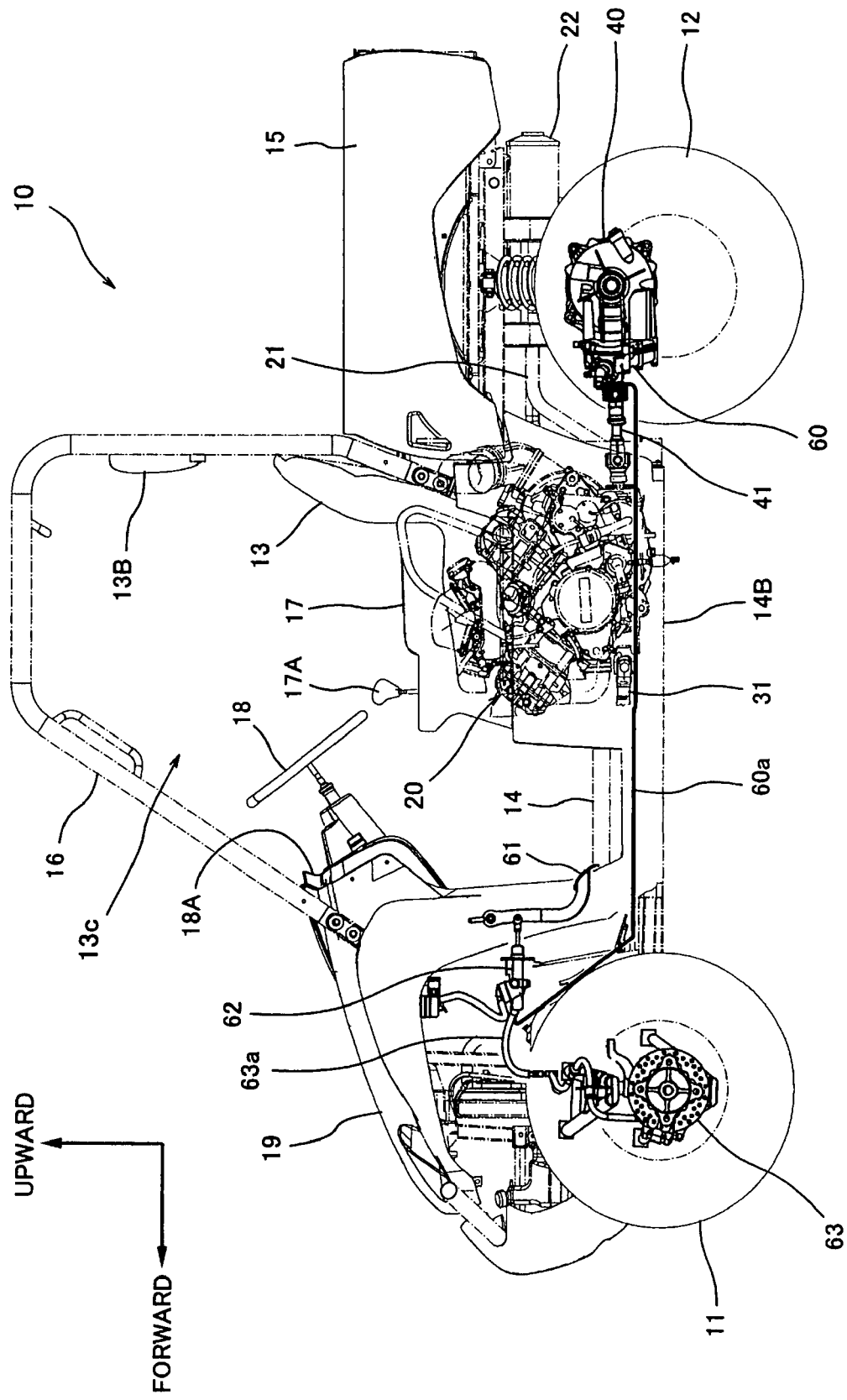
FIG. 3 is a left side view showing in perspective the drive system and a brake system of the utility vehicle of FIG. 1.
Figure 4:
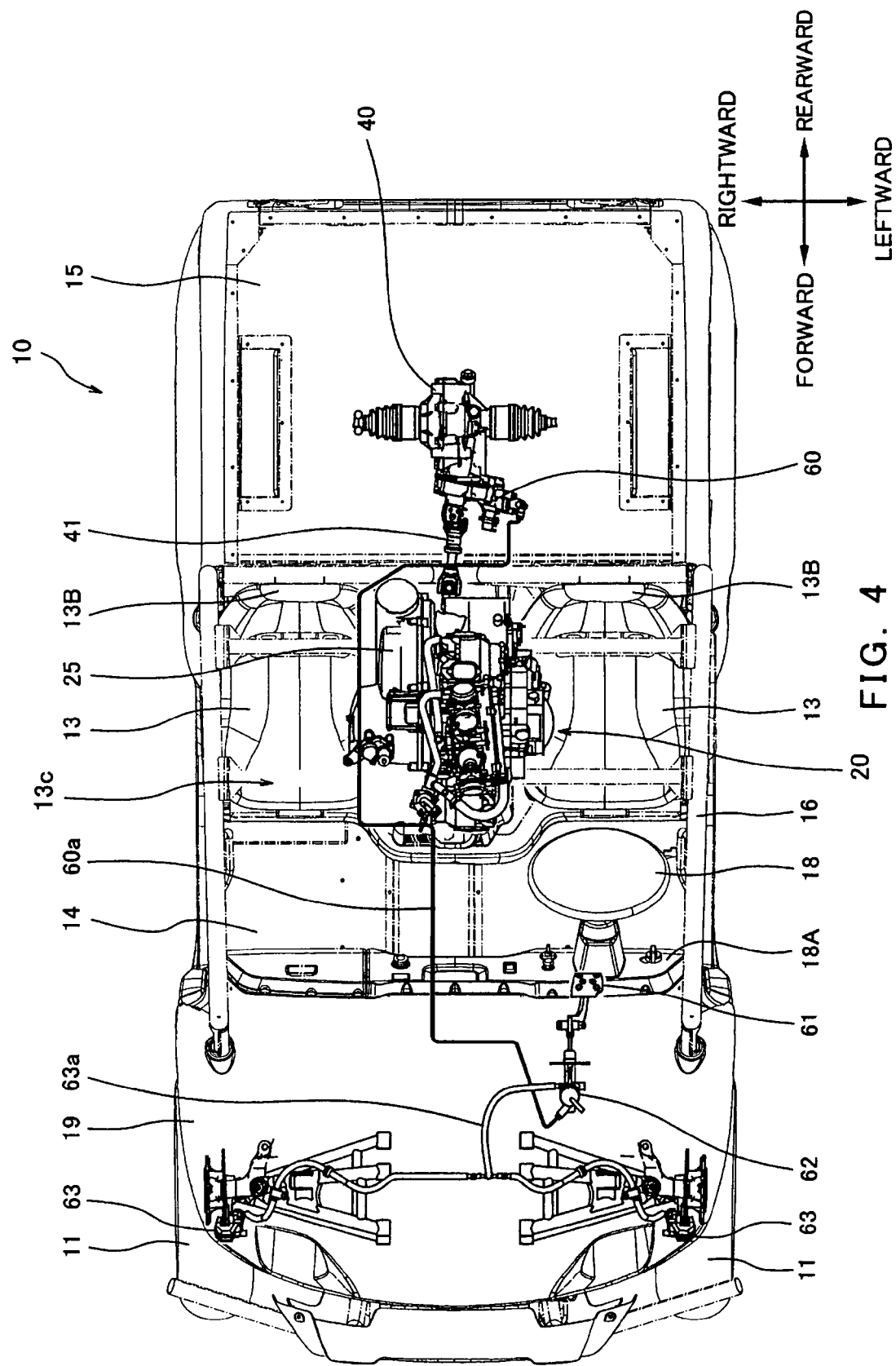
FIG. 4 is a plan view showing in perspective the drive system and the brake system of the utility vehicle of FIG. 1.

FIG. 3 is a left side view showing in perspective a brake system of the utility vehicle 10 of FIG. 1 and FIG. 4 is a plan view thereof. As shown in FIGS. 3 and 4, in this embodiment, the brake system of the utility vehicle 10 includes front wheel brakes 63 mounted to axles of the right and left wheels 11 and a rear wheel brake 60 mounted to a power transmission path between the rear propeller shaft 41 and the rear gear assembly 40. The rear wheel brake 60 is positioned behind the engine unit 20. The engine unit 20 covers the rear wheel brake 60 from forward to protect the rear wheel brake 60 from mud and other substances from a road surface, bouncing stones, etc.

Figure 5:
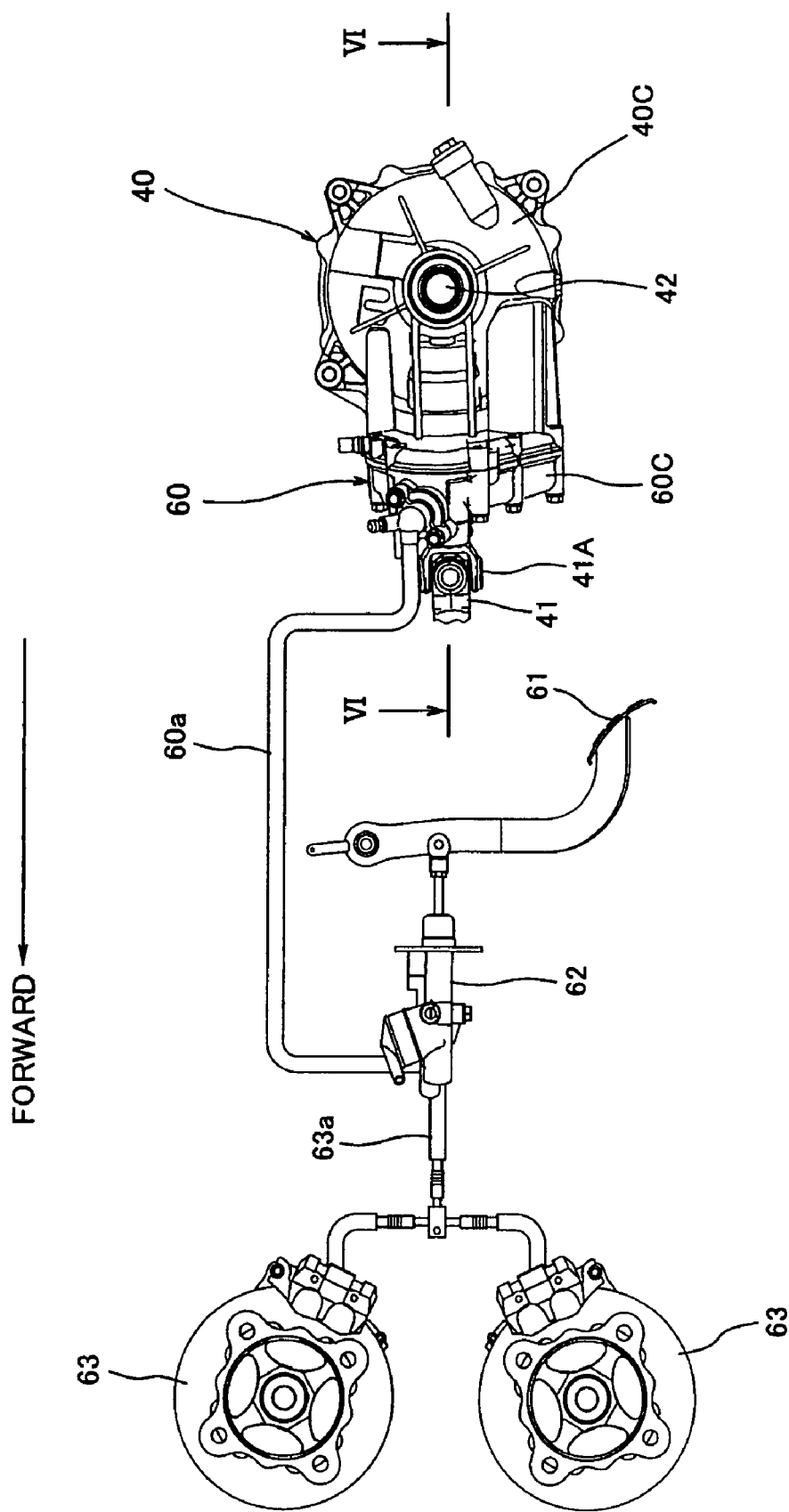
FIG. 5 is a schematic view showing a construction of the brake system shown in FIGS. 2 to 4.

FIG. 5 schematically shows the brake system. A master cylinder 62 is disposed forward of the brake pedal 61 and is coupled to an oil-pressure source which is not shown. One end of an oil-pressure pipe 63a is coupled to the master cylinder 62 and an opposite end branches and is coupled to the front wheel brakes 63 (disc brakes in this embodiment). In this construction, upon an operator operating the brake pedal 61, an oil pressure is applied to the front wheel brakes 63, thus applying a braking force to the front wheels 11.

One end of an oil-pressure pipe 60a is coupled to the master cylinder 62. An opposite end of the oil-pressure pipe 60a extends through a region under the floor 14 and the engine unit 20 to a rear portion of the vehicle (see FIG. 3) and is coupled to the rear wheel brake 60 integral with the rear gear assembly 40. As shown in FIG. 3, the oil-pressure pipe 60a is positioned higher than a bottom surface 14B of the vehicle body frame so that the vehicle body frame and the like protect the pipe 60a from mud and other substances from the road surface, bouncing stones, etc.

Figure 6:
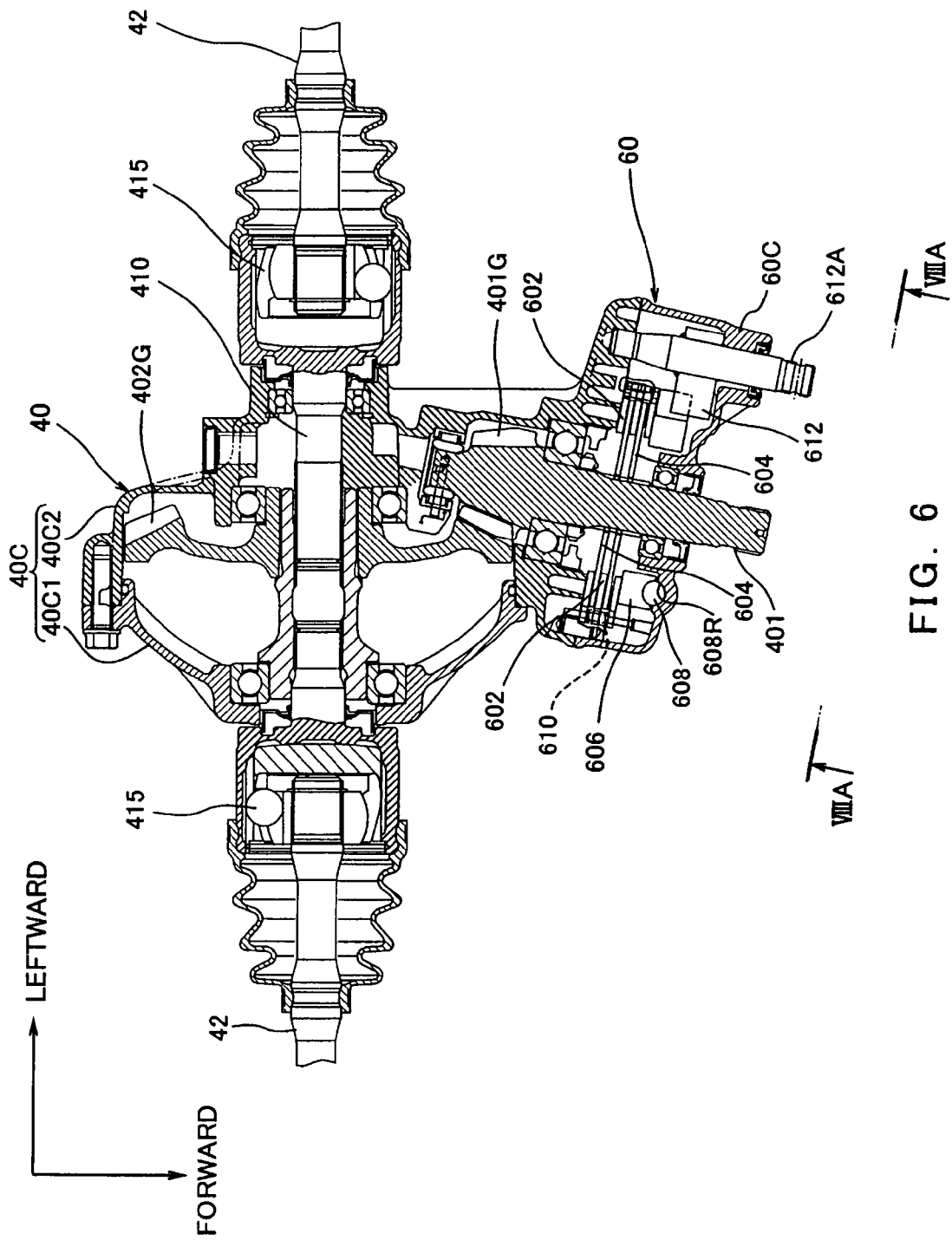
FIG. 6 is a cross-sectional view taken in the direction of arrows substantially along line VI-VI of FIG. 5, showing a construction of a gear assembly and a wet brake mechanism for rear wheels.

With reference to FIGS. 4, 5, and 6, a rotational driving force is transmitted from the engine unit 20 through the rear propeller shaft 41 and input to an input shaft 401 of the rear gear assembly 40 which is coupled to the rear propeller shaft 41 via a universal joint 41A (see FIG. 5). The input shaft 401 is oriented in the longitudinal direction of the vehicle 10. A small-diameter bevel gear 401G is formed on a rear end portion of the input shaft 401, and is configured to transmit the rotational driving force to a large-diameter bevel gear 402G which meshes with the small-diameter bevel gear 401G. The large-diameter bevel gear 402G is mounted on an intermediate shaft 410 which is an output shaft of the rear gear assembly 40, and is configured to transmit the rotational driving force to the intermediate shaft 410. The intermediate shaft 410 extends in a lateral direction of the vehicle 10 and is coupled to right and left drive shafts 42 coupled to the rear wheels 12 (see FIGS. 1 to 3) via constant-velocity joints (CV joints) 415 provided at both end portions thereof.

The front gear assembly 30 will not be described in detail for the sake of simplicity.

As shown in FIG. 6, the above described rear wheel driving force transmission system, from a tip end portion of the input shaft 401 to the CV joints 415, is continuously covered with a gear case 40C of the rear gear assembly 40 and a brake case 60C of the rear wheel brake 60 covering the gear case 40 from forward. The gear case 40C includes a right gear case 40C1 configured to accommodate therein and support a right part of the intermediate shaft 410, and a left gear case 40C2 configured to accommodate therein the large-diameter bevel gear 402G, the small-diameter bevel gear 401G, and a left part of the intermediate shaft 410. A right opening is formed on a right end surface of the left gear case 40C2 to allow the large-diameter bevel gear 401G to pass therethrough. A front opening is formed on a front end surface of the left gear case 40C2 to allow the small-diameter bevel gear 401G to pass therethrough from forward. The right opening of the left gear case 40C2 is covered with the right gear case 40C1 and the front opening of the left gear case 40C2 is covered with the brake case 60C.

Figure 8B:
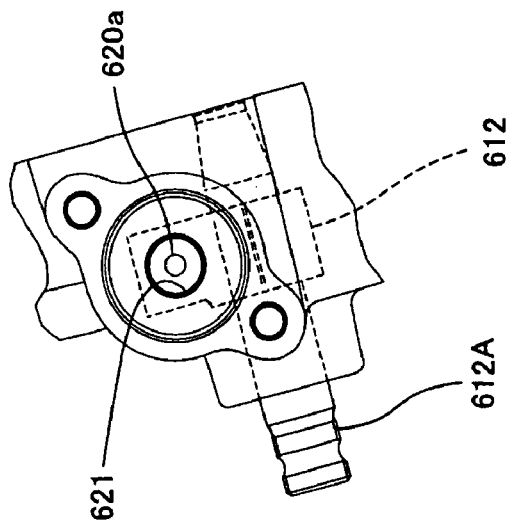
FIG. 8B is a view taken in the direction of arrows substantially along line VIIIB-VIIIB of FIG. 8A.
Figure 8A:
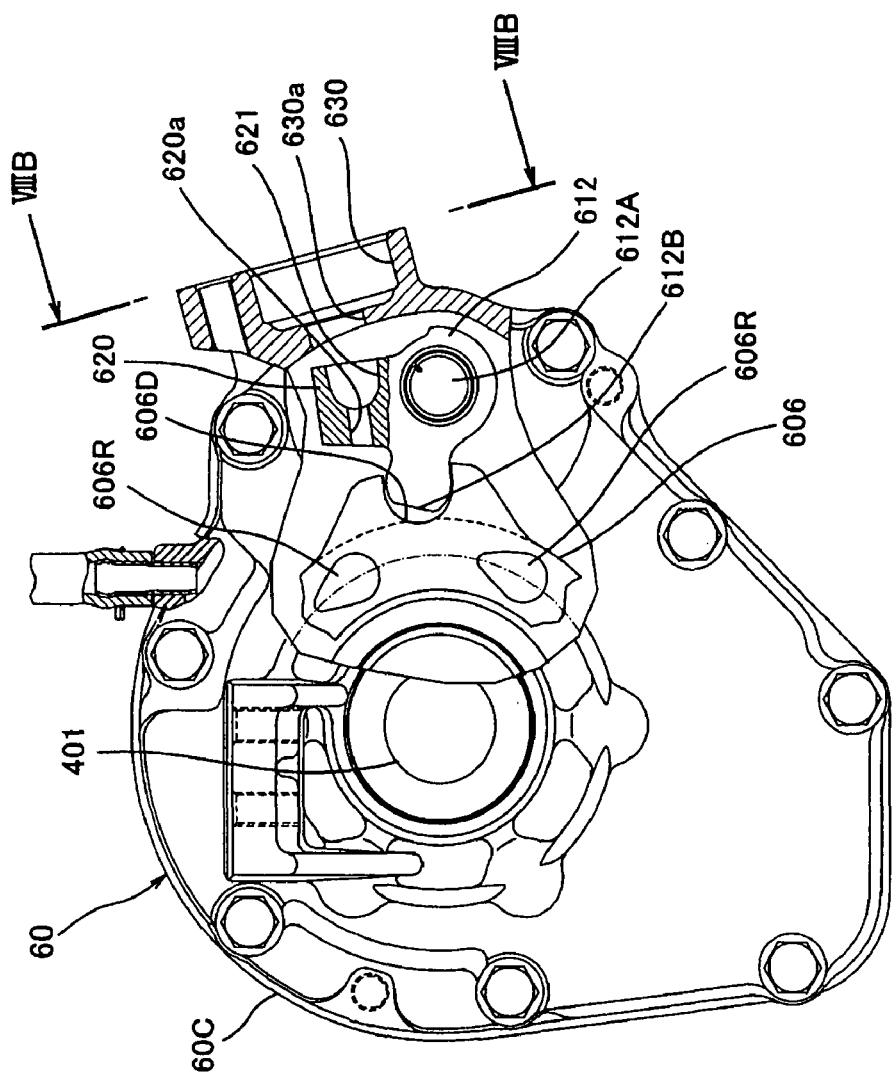
FIG. 8A is a view taken in the direction of arrows substantially along line VIIIA-VIIIA of FIG. 6, showing in a partial cross-section, the construction of the wet brake mechanism for rear wheels, from which a hydraulic cylinder is omitted.

The rear wheel brake 60 includes a plurality of friction plates 604 and a plurality of annular pressing plates 602 inside the brake case 60C. The friction plates 604 are disc-shaped and mounted to an outer peripheral surface of the input shaft 401 so as to be able to rotate integrally with the input shaft 401 and so as to be slidable in an axial direction of the input shaft 401. The pressing plates 602 and the friction plates 604 are arranged to be axially alternate. The pressing plates 602 are unrotatably mounted to the brake case 60C in such a manner that they are rotatable and axially slidable relative to the input shaft 401. In this embodiment, an annular cam plate 606 is coupled to an end surface of the pressing plate 602 that is located in front. As shown in FIG. 8A, six cam grooves 606R having a taper shape like tear drop in a longitudinal section are arranged to be substantially equally spaced apart from each other in a circumferential direction. As shown in FIG. 6, six semicircular holes 608R are formed on an inner surface of the case 60C which faces the cam grooves 606R so as to respectively correspond to the cam grooves 606R, and rigid balls 608 are fitted into these holes 608R.

As shown in FIG. 6, a return spring 610 is mounted to the pressing plates 602 to apply a forward force to the pressing plates 602 to inhibit engagement of the pressing plates 602 with the friction plates 604. A side surface of a rear portion of the pressing plate 602 is opposite to a front end surface (joint surface with the brake case 60C in this embodiment) of the left gear case 40C2.

In the above described construction, in a non-operating state, the rigid balls 608 are fitted into the deepest position of the cam grooves 606R, and the cam plate 606 is disposed in the foremost position. In this state, the pressing plates 602 coupled to the cam plate 606 are apart from the friction plates 604. Upon the cam plate 606 rotating in a specified direction, the rigid balls 608 slide along on the cam grooves 606R, causing the cam plate 606 to be pushed backward (toward the friction plates 604) along the axial direction of the input shaft 401 against the force applied by the return spring 610. This brings the pressing plates 602 coupled to the cam plate 606 into engagement with the friction plates 604, applying the braking force to the rotating input shaft 401 coupled to the friction plates 604.

Upon the cam plate 606 rotating in a reverse direction, the rigid balls 608 slide along on the cam grooves 606R in a reverse direction, and the cam plate 606 is pushed back forward by the force applied by the return spring 610. This brings the pressing plates 602 coupled to the cam plate 606 out of engagement with the friction plates 604, thus permitting the rotation of the input shaft 401 coupled to the friction plates 604.

As shown in FIG. 6, the rotation of the cam plate 606 is made by the rotation of an internal operation lever 612 which is mounted inside the brake case 60C and configured to engage with the cam plate 606.

FIG. 8A is a view taken in the direction of arrows substantially along line VIIIA-VIIIA of FIG. 6, showing the cam plate 606 and the internal operation lever 612 in partial cross-section. FIG. 8B is a view taken in the direction of arrows substantially along line VIIIB-VIIIB of FIG. 8A. As shown in FIG. 8A, a part of an outer peripheral surface of the cam plate 606 protrudes radially, and a driven groove 606D is formed at a center region of the protruding portion to axially extend. The driven groove 606D has a semi-circular cross-section as seen from the axial direction (seen in the direction of arrows along VIIIA-VIIIA of FIG. 6).

The internal operation lever 612 is provided with a driving protrusion 612B protruding radially. The driving protrusion 612B is accommodated in the driven groove 606D. As shown in FIG. 8A, the driving protrusion 612B substantially conforms in shape to the driven groove 606D as seen in the axial direction (seen in the direction of arrows along VIIIA-VIIIA of FIG. 6). A tip end portion of the driving protrusion 612B is cut to reduce an effect of metal powder generated by the engagement with the driven groove 606D.

Figure 7:
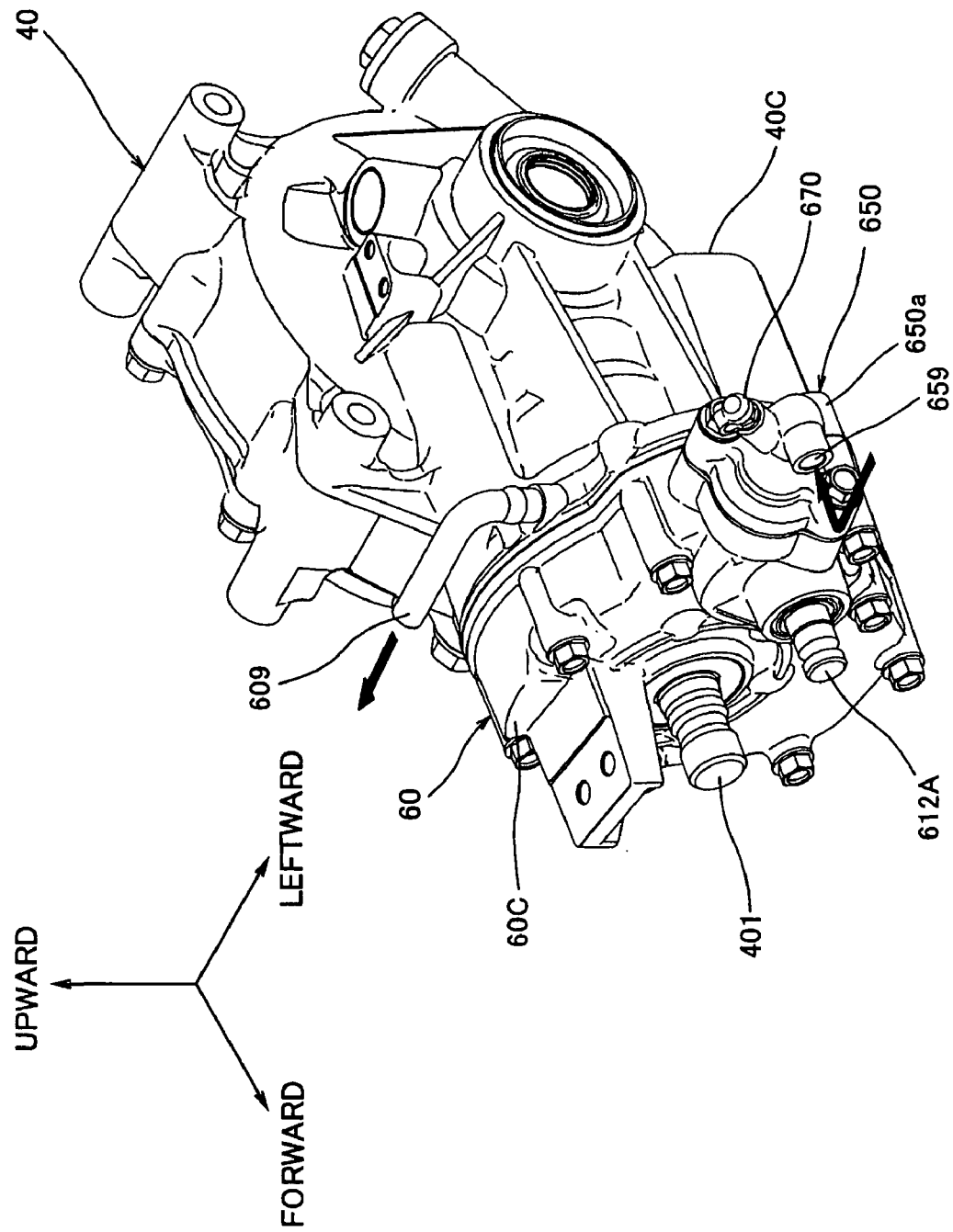
FIG. 7 is a perspective view of the construction of the gear assembly and the wet brake mechanism for rear wheels of FIG. 5, as viewed from leftward and forward.

In this embodiment, as shown in FIG. 8B, a rotational shaft 612A of the internal operation lever 612 extends forward and protrudes outside the case 60C (see FIG. 7). Such a structure is intended to enable external operation and not to achieve hydraulic driving described below. Therefore, it will be appreciated that in some embodiments this structure may be omitted.

Figure 9:
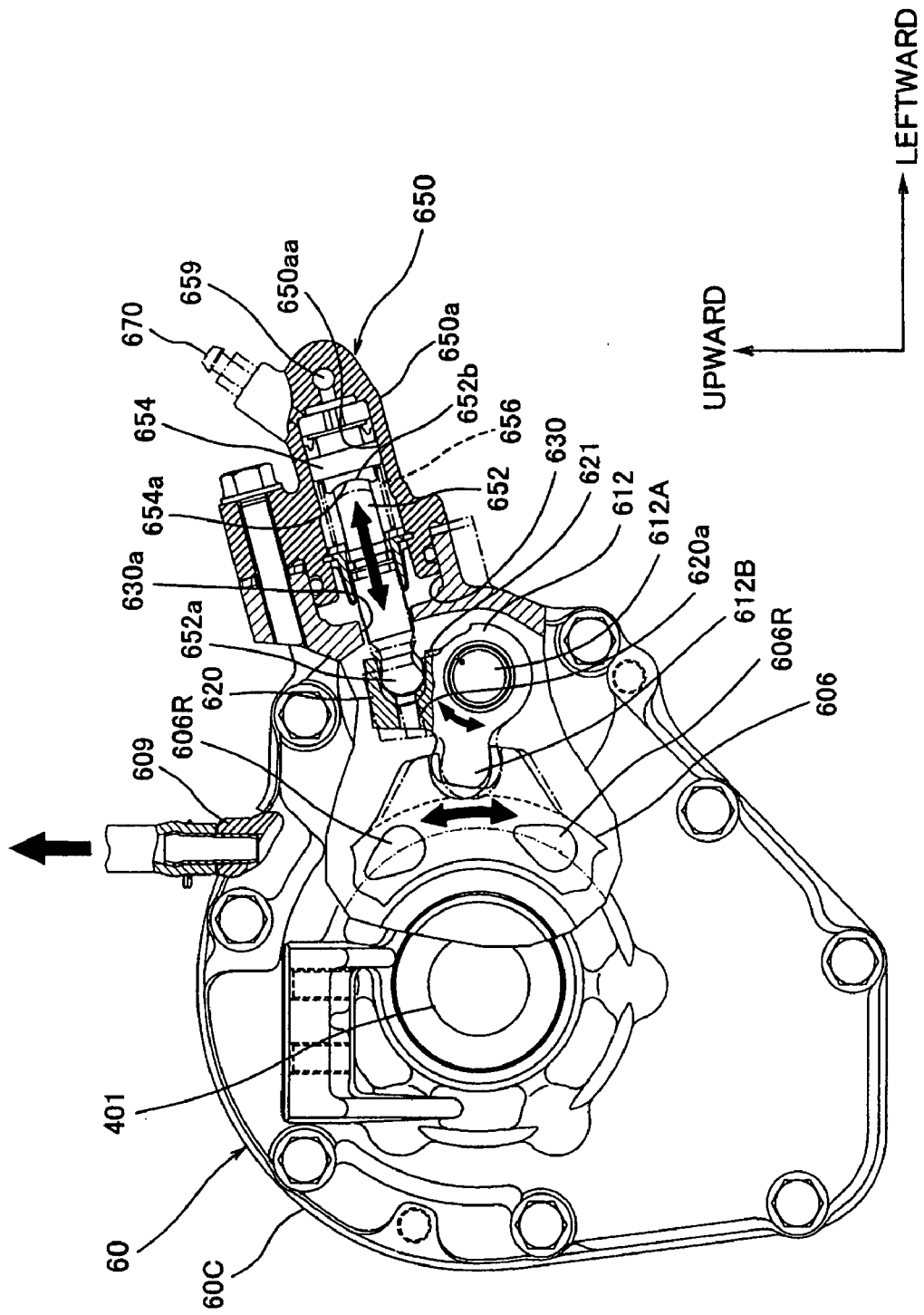
FIG. 9 is a view showing an operation of the wet brake mechanism for rear wheels of FIG. 8A, into which a hydraulic cylinder is incorporated.

Turning to FIG. 8A again, a driven protrusion 620 is formed on an outer periphery of the internal operation lever 612 to extend in the circumferential direction of the internal operation lever 612. A spherical hole 621 is formed to extend to an intermediate position of the driven protrusion 620 and to open in a rotation tangential direction of the internal operation lever 612. An opening 630 is formed in a position of the brake case 60C that the spherical hole 621 faces and is connected to an inner space of the brake case 60C through a communicating hole 630a having a diameter smaller than that of the opening 630. As shown in FIG. 9, a hydraulic cylinder 650 with a case 650a is mounted to a flange portion provided at an outer end surface of the opening 630.

The hydraulic cylinder 650 includes a rod-shaped operating portion (spindle) 652 which is configured to be movable along the axis thereof. The rod-shaped operating portion 652 of the hydraulic cylinder 650 protrudes from the opening 630 of the brake case 60C into an interior of the brake case 60C through the communicating hole 630a. The operating portion 652 has a spherical tip end portion 652a to be fitted into the spherical hole 621 of the internal operation lever 612. To be specific, in the interior of the brake case 60C, the tip end portion 652a of the operating portion 652 and the spherical hole 621 of the internal operation lever 612 are coupled to each other such that the operating portion 652 and the internal operation lever 612 are pivotable relative to each other, thus forming a ball joint. Whereas the tip end portion 652a of the operating portion 652 and the spherical hole 621 of the internal operation lever 612 are in a spherical-surface contact state so that they are pivotable in any direction, contact surfaces of the internal operation lever 612 and the operating portion 652 may alternatively be formed by planar curved surfaces so that they are pivotable only in a rotational direction of the internal operation lever 612. A penetrating hole 620a is formed on a bottom portion of the spherical hole 621 so that the tip end portion 652a of the operating portion 652 fitted in the spherical hole 621 is sufficiently lubricated.

The operating portion 652 is supported inside the case 650a of the hydraulic cylinder 650 so as to be able to tilted by a predetermined angle with respect to an actuating direction (center axis direction) of a piston portion 654 of the hydraulic cylinder 650 described later. A base end portion 652b of the operating portion 652 to be contacted with the piston portion 654 is formed to have a protruded curved surface.

The piston portion 654 has an axial front end surface 654a forming a concave curved surface which is configured to make curved-surface contact with the base end portion 652b of the operating portion 652. The piston portion 654 is mounted to a cylinder portion 650aa of a tubular case 650a via an oil seal and is configured to be axially slidable. The piston portion 654 is subjected to a force applied by a coil spring 656 internally mounted in the case 650a to be away (rightward in FIG. 9) from the base end portion 652a of the operating portion 652. Thereby, in a normal state, the piston portion 654 is most distant from the opening 630.

An oil inlet 659 (see FIG. 7) is provided on the case 650a on a back surface side of the piston portion 654 (opposite side of an axial front end surface 654a). The oil-pressure pipe 60a (FIG. 5) is coupled to the oil inlet 659. An air release opening 670 (attached with a cap in the structure of FIG. 7) is provided in a position of the case 650a adjacent the oil inlet 659 at a highest position of the cylinder portion 650a of the case 650a so as to open upward. Thus, since the air release opening 670 is disposed in the highest position of the cylinder portion 650aa of the case 650a, air release from the cylinder portion 650aa is easily accomplished when the hydraulic cylinder 650 is incorporated into the gear case 40C.

When the operator operates the brake pedal 61 and the oil pressure is supplied from the master cylinder 62 to the oil inlet 659 through the oil-pressure pipe 60a, the oil pressure is applied to the piston 654 from its back surface side (from leftward in FIG. 9), causing the piston portion 654 to be pushed axially (rightward in FIG. 9) against the force applied by the coil spring 656. The piston portion 654 axially pushes out the operating portion 652 in the curved-surface contact with the piston portion 654 and pushes the driven protrusion 620 of the internal operation lever 612 with the spherical tip end portion 652a, causing the internal operation lever 612 to rotate counterclockwise in FIG. 9. As a result, the cam plate 606 rotates and generates the braking force as described above.

Under this condition, when supply of the oil pressure is stopped, the cam plate 606 is caused to rotate in the reverse direction by the action of the return spring 610 returning to its initial rotational position, causing the internal operation lever 612 to rotate in the reverse direction to return to its initial rotational position. By the internal operation lever 612, the operating portion 652 and the piston portion 654 are pushed back to their initial axial positions.

During the supply of the oil pressure, the oil which flows from a space located at the back surface of the piston portion 654 into the case 60C lubricates and cools components in the interior of the case 60C. Thereafter, the oil is discharged to the outside the case 60C through an oil outlet 609 (see FIG. 7) provided at an upper portion of the case 60C.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A wet brake system for a vehicle comprising:
    a case;
    an internal operation lever;
    a hydraulic cylinder which is integrally mounted to the case and is configured to actuate the internal operation lever; and
    a brake mechanism configured to be operated by the actuation of the internal operation lever by the hydraulic cylinder to apply a braking force to an axle of the vehicle;
    wherein the brake mechanism includes a cam plate which is rotatable to cause the brake mechanism to generate the braking force, and the cam plate has a protruding portion protruding circumferentially;
    wherein the internal operation lever includes a rotational shaft, a driving protrusion protruding radially from the rotational shaft, and a driven protrusion protruding radially from the rotational shaft;
    wherein the hydraulic cylinder includes a cylinder case forming a cylinder portion, a piston portion which is axially movable inside the cylinder by an action of an oil pressure, and an operating portion coupled to an axial end surface of the piston portion;
    wherein a base end portion of the operating portion is coupled to the axial end surface of the piston portion to make a curved-surface contact between them to cause the operating portion to tilt axially by the action of the oil pressure via the piston portion, a tip end portion of the operating portion is coupled to the driven protrusion of the internal operation lever by a ball joint, and the driving protrusion of the internal operation lever is coupled to the protruding portion of the cam plate to make a curved-surface contact between them; and
    wherein the operating portion of the hydraulic cylinder protrudes into the case, and the driving protrusion and the driven protrusion of the internal operation lever are disposed in the case.

2. The wet brake system for a vehicle according to claim 1, wherein the brake mechanism includes a ball cam mechanism that is disposed inside the case and is configured to provide engagement and disengagement between a brake friction plate coupled to an axle side and a pressing plate coupled to a case side; and
    wherein the internal operation lever is configured to operate the ball cam mechanism to provide engagement and disengagement between the friction plate and the pressing plate.

3. The wet brake system for a vehicle according to claim 2, wherein the case is positioned behind an engine of the vehicle.

4. The wet brake system for a vehicle according to claim 3, wherein the case includes a gear case configured to accommodate a rear wheel final reduction gear unit of the vehicle.

5. The wet brake system for a vehicle according to claim 1, wherein the case of the hydraulic cylinder has an air release opening oriented upward to release air in the cylinder portion accommodating the piston portion.

6. The wet brake system according to claim 1, wherein an end portion of the rotational shaft of the internal operation lever protrudes outside the case, and the internal operation lever is operable from outside separately from the hydraulic cylinder.

7. The wet brake system according to claim 1, wherein the driving protrusion of the internal operation lever is fitted into a groove formed in the protruding portion of the brake mechanism to make a curved-surface contact between them, and a tip end portion of the driving protrusion has a cut portion.

8. The wet brake system according to claim 1, further comprising:

a rear wheel final reduction gear unit disposed in the case;

wherein the rear wheel final reduction gear unit includes an input shaft extending forward and rearward, to which a rotational driving force of an engine of the vehicle is input, and an intermediate shaft which is coupled to the input shaft via a bevel gear and extends rightward and leftward, where right and left axles are coupled to opposite end portions of the intermediate shaft, respectively; and wherein the brake mechanism is configured to apply the braking force to the input shaft to apply the braking force to the right and left axles.

9. The wet brake system according to claim 8, wherein the case includes:

right and left gear cases configured to accommodate the intermediate shaft, the bevel gear, and an end portion of the input shaft on which the bevel gear is mounted; and a brake case configured to accommodate an opposite end portion of the input shaft, the brake mechanism, the driving protrusion, and the driven protrusion of the internal operation lever;

wherein the brake case is attached to front portions of the right and left gear cases.

10. The wet brake system according to claim 9, wherein the cylinder case is attached to the brake case.

11. A utility vehicle comprising:

a wet brake system for the vehicle including:

a case;

an internal operation lever;

a hydraulic cylinder integrally mounted to the case and which is configured to actuate the internal operation lever; and a brake mechanism configured to be operated by the actuation of the internal operation lever by the hydraulic cylinder to apply a braking force to an axle of the vehicle;

wherein the brake mechanism includes a cam plate which is rotatable to cause the brake mechanism to generate the braking force, and the cam plate has a protruding portion protruding circumferentially;

wherein the internal operation lever includes a rotational shaft, a driving protrusion protruding radially from the rotational shaft, and a driven protrusion protruding radially from the rotational shaft;

wherein the hydraulic cylinder includes a cylinder case forming a cylinder portion, a piston portion which is axially movable inside the cylinder by an action of an oil pressure, and an operating portion coupled to an axial end surface of the piston portion;

wherein a base end portion of the operating portion is coupled to the axial end surface of the piston portion to make a curved-surface contact between them to cause the operating portion to tilt axially by the action of the oil pressure via the piston portion, a tip end portion of the operating portion is coupled to the driven protrusion of the internal operation lever by a ball joint, and the driving protrusion of the internal operation lever is coupled to the protruding portion of the cam plate to make a curved-surface contact between them; and wherein the operating portion of the hydraulic cylinder protrudes into the case, and the driving protrusion and the driven protrusion of the internal operation lever are disposed in the case.

* * * * *